US006584679B2

(12) United States Patent
Apfelthaler

(10) Patent No.: US 6,584,679 B2
(45) Date of Patent: Jul. 1, 2003

(54) DEVICE FOR HOLDING AND INSTALLING A SPACER FRAME OF AN INSULATED GLASS WINDOW

(75) Inventor: Harald Apfelthaler, Langenzenn (DE)

(73) Assignee: R & R Sondermaschinen GmbH (DE)

( * ) Notice: Subject to any disclaimer, the term of this patent is extended or adjusted under 35 U.S.C. 154(b) by 0 days.

(21) Appl. No.: 09/865,685

(22) Filed: May 25, 2001

(65) Prior Publication Data

US 2002/0046459 A1 Apr. 25, 2002

(30) Foreign Application Priority Data

Oct. 20, 2000 (DE) ........................................ 100 52 157

(51) Int. Cl.[7] ................................................ B23P 21/00
(52) U.S. Cl. ............................ 29/701; 29/709; 29/721; 29/281.4; 269/164
(58) Field of Search .......................... 29/701, 709, 721, 29/798, 275, 281.1, 281.4, 281.5, 283, 407.01, 407.09, 407.1, 525.11, 559, 897.31; 52/456; 269/152, 164

(56) References Cited

U.S. PATENT DOCUMENTS 5,539,975 A * 7/1996 Kukuljan et al. ............. 29/701
5,685,060 A * 11/1997 Tibbet ......................... 29/559

FOREIGN PATENT DOCUMENTS

JP 354132879 A * 10/1979 .................. 29/709
JP 359166428 A * 9/1984 .................. 29/283
JP 406023631 A * 2/1994 .................. 29/701

* cited by examiner

*Primary Examiner*—Gregory Vidovich
*Assistant Examiner*—Jermie E. Cozart
(74) *Attorney, Agent, or Firm*—Gifford, Krass, Groh, Sprinkle, Anderson & Citkowski, P.C.

(57) ABSTRACT

The present invention concerns a controllable holding and mounting device for use with the construction of an insulated glass window. The mounting device includes a mounting frame and a tie-bar. A positioning laying-on device is connected to the tie-bar and adapted to support a spacer frame for the window. The spacer frame is fixed into position in the mounting device by a distance positioning supporting device that engages the spacer frame and fixes it between the supporting device and the laying-on device. A gripping device is provided that is adapted to support and position a muntin within the spacer frame. A screwing device that is movable relative to the spacer frame is also provided and is capable of driving a screw through the spacer frame and into the muntin to thereby secure the muntin to the spacer frame.

16 Claims, 1 Drawing Sheet

DEVICE FOR HOLDING AND INSTALLING A SPACER FRAME OF AN INSULATED GLASS WINDOW

FIELD OF THE INVENTION

Figure 1:
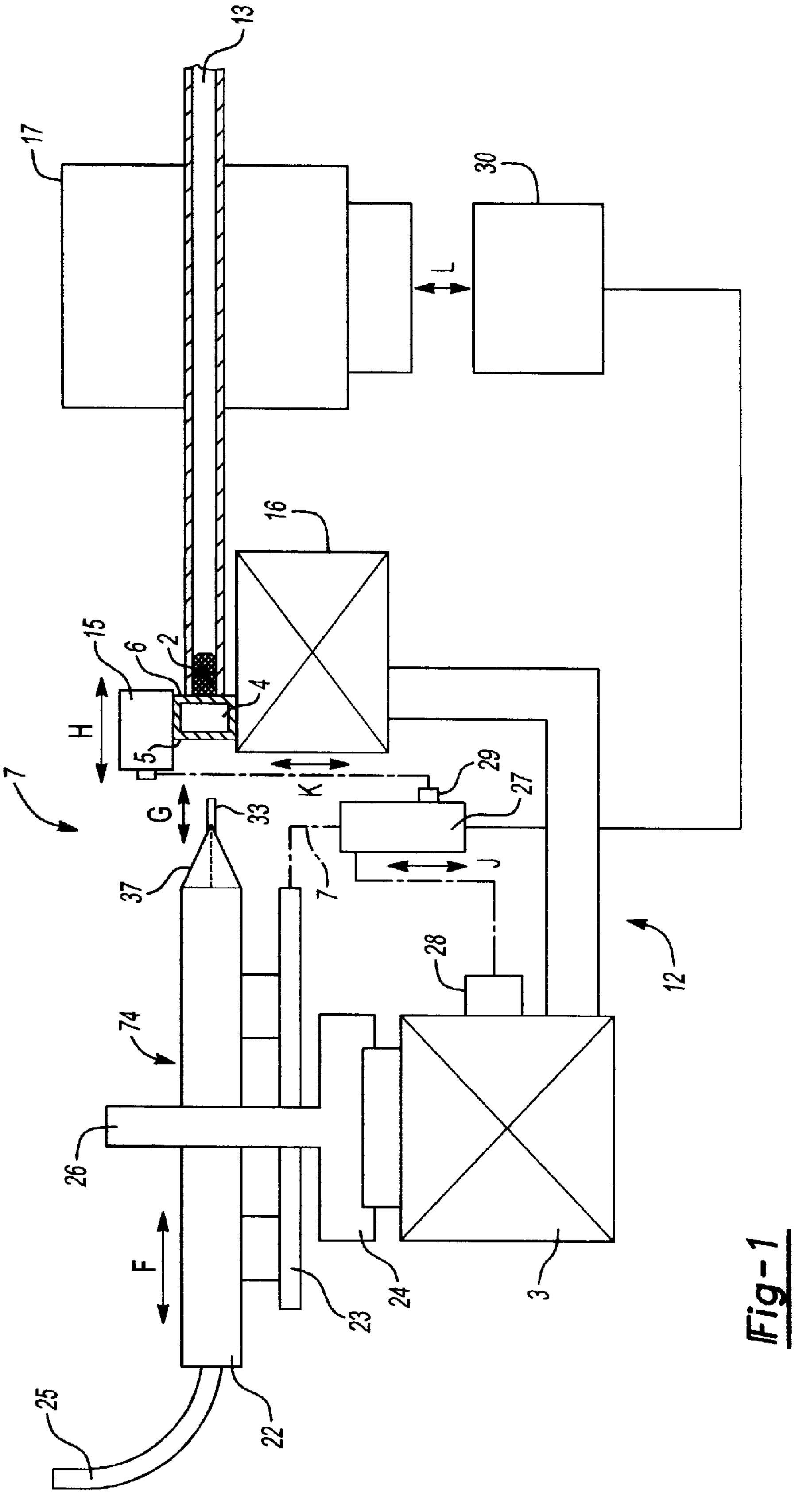

The present invention relates to a controllable holding and mounting device including a mounting frame and tie-bars movably supported thereon for installing muntin bars or a muntin grating into a spacer frame of an insulated glass window.

BACKGROUND OF THE INVENTION

Installing a muntin bar or a muntin grating into spacer frame of an insulated glass window has been realized hitherto by means of a manually operated mounting table, onto which the spacer frame is to be fixed. After having positioned the muntin bar or the muntin grating including the step of aligning these pieces within the frame by means of optical auxiliary lines or integrated measuring tapes the muntin bars or the muntin grating has been manually fixed by using retaining clamps or nails which are shot through the spacer frame from the outside thereof by using a pneumatically operated hammer. Further, plastic plugs are used which are plugged into one end of the muntin bar, so that they abut against an inner side of the spacer frame thereby anchoring the clamps or nails into the plug body.

This method actually has to be performed manually including arranging and adjusting the spacer frame along with the muntin bars or the muntin grating, leading to the fact that due to being labor intensive this method is very time consuming and expensive.

SUMMARY OF THE INVENTION

It is thus a primary object of the present invention to provide a holding and mounting device for the above purpose, which device is to be automatically positioned and adjusted in a program controlled manner for realizing the fixing process, i.e. the screwing operation, without any manual handling.

Another object of the invention is to provide an above described device according to which failures in positioning and aligning are eliminated.

It is thus an object of the present invention to provide a device according to the above aspect which device is designed such that a plurality of units and arrangements can be movably supported by tie-bars which in turn are carried by a mounting frame. Thus, the total operating process is to be carried out automatically including the steps of positioning the frame and the muntin bars or the muntin grating.

According to the invention, there is provided a controllable holding and mounting device comprising

- a mounting frame and tie-bars movably supported thereon for fixing muntin bars or a muntin grating to a spacer frame of an insulated glass window, and having
- a positioning laying-on device for said frame for carrying a spacer frame to be machined,
- a gripping jaw device for gripping the muntin bar or the muntin cross to be installed into the spacer frame, a
- screwing device adjustable both in its vertical and lateral directions, the head of which can be aligned relative to the outside of the spacer frame being gripped and hold down for screwing the muntin bar or the muntin cross to the inner side of the frame, and
- a distance positioning supporting device connected to the gripping jaw device, wherein all the devices are program-controlled in relation to each other.

By means of this device all possible sources of errors caused due to manual handling can be eliminated leading both to a reduction of manufacturing costs and of manufacturing time as well as to minimum degree of rejects. Since said device can be operated in an almost vertical working plane it is optimally adapted to the manufacturing conditions of insulated glass windows. Further, the space requirements for such a mounting device are more inferior by using the said device in accordance with a mounting frame including tie-bars arranged thereon.

Other preferred embodiments of the invention are characterized in the subclaims. In this respect, it is to be noted that the screwing unit is movably supported on a bearing block in the longitudinal direction of a tie-bar of a mounting frame for said spacer frame and comprises a plate including a guiding rail and is adjustable in its height, which plate can be moved in the longitudinal direction relative to the spacer frame for the purpose of centering. Further, the claw unit comprises a sensor pin movable relative to the distance positioning supporting device, so that the upper surface of the spacer frame can be scanned. Said sensor pin further can be moved relative to a tie-bar of the spacer frame as also to another sensor pin being movably carried by this tie-bar.

Further, all the movements of the screwing apparatus, the distance positioning supporting device, the gripping jaw device, the claw unit and the positioning laying-on device for said frame connected to a tie-bar of the mounting frame, are networked with one another so that the spacer frame and the muntin bars or the muntin grating to be installed therein can be arranged into a desired screwing position before carrying out the screwing process, wherein these elements can be fixedly held until terminating this process.

By using a precise guiding system including an electronic scanning system, the positions of the spacer frame and the muntins or the muntin grating as also the ones of the machining units are continuously controlled and compared with one another, so that a possibly misalignment is immediately corrected. By employing special torque clutches and electronic sensors both the screwing actions and the screwing depth are controlled.

DESCRIPTION OF THE PREFERRED EMBODIMENT OF THE INVENTION

The invention now will be described in more detail by taking reference to the accompanying FIG. 1 showing a preferred embodiment of the invention.

FIG. 1 herein schematically discloses an assembly of the main parts of the holding and mounting device in operation.

The controllable holding and mounting device 1 cooperates with a positioning laying-on device 16 which belongs to a mounting frame (not shown). The positioning laying-on device 16 in turn is connected to a movably supported tie-bar 3 arranged onto the mounting frame. The positioning laying-on device 16 is carrying a spacer frame 4 of an insulated glass window still to be fabricated, into which spacer frame a muntin cross 13 is to be fixed at the inner side thereof. Both the spacer frame and the muntin cross are hollow profiles and are shown in the figure in cross sectional and longitudinal sectional view, respectively.

Fixing the muntin bar is realized by using a plastic plug 2 which is plugged into a facing end of one of the muntins of the muntin cross 13, wherein an ending flange of which abuts against the inner side of the muntin bar for and is thus prevented from sliding into it. Then, a screw 33 is supplied via a tubular pneumatically air hose supplying device 25, which screw is screwed into the outer wall 5 of the hollow profile of the spacer frame 4 by means of the screwing unit. Herein, the screw passes through the hollow space of the spacer frame and through the inner wall 6 of that frame into said plug 2 which is already anchored within the muntin or which will be anchored due to the screwing process.

Said screwing apparatus 22 being adjustable both in vertical and lateral directions is arranged on a bearing block 24 movable along the longitudinal direction of the tie-bar of the mounting frame, such that, for the purpose of screwing the muntin bar or the muntin cross 13 to the spacer frame 4, it can be positioned with respect to the outer wall of the spacer frame 4 which is fixed and held down.

For the purpose of performing this operation, the screwing device 22 being generally characterized by number 14 is connected to a guiding rail 26 and is such supported onto a vertical adjustable plate 23 so that it can be moved in the longitudinal and lateral directions. Moving the screwing apparatus in the longitudinal direction is denoted by arrow F corresponding to the movement of the screw 33 denoted by arrow G.

The spacer frame 4 itself must be fixed within the mounting frame (not shown) before fixing the muntin bar or the muntin cross 13, so that a precise positioning of the mounting device, i.e. the screwing unit 22 and a precise fixing of the plug can be carried out by means of the screw to be screwed in. This fixing operation is realized by means of a distance positioning supporting device 15 which is movably supported onto or above the spacer frame 4 as shown by arrow H, wherein the spacer frame 4 is gripped between said distance positioning supporting device 15 and the positioning laying-on device 16 for the frame connected to the tie-bar 3.

A gripping jaw device 17 gripping the muntin cross is used to ensure an exact positioning and gripping of the muntin bar or the muntin cross 13, which gripping jaw device is held movably in the directions shown by arrow L by means of a hydraulic or pneumatic plunger 30. The plunger 30 is connected to a claw unit 27 which in turn comprises a sensor pin 29 being movable relative to the distance positioning supporting device 15, so that the upper surface of the spacer frame 4 can be scanned. On the other hand, the claw unit 27 can be moved relative to the tie-bar 3 of the mounting frame and a sensor pin 28 fixed thereto. Possible moving directions of the claw unit 27 are shown by arrows K and J. For the purpose of centering, the claw unit 27 is connected to the screwing unit 22 shown by the dotted line 7 in the drawing.

The mode of operative of the controllable holding and mounting device is automatically performed and program-controlled, wherein the single movements are triggered and guided by means of intermittently actuated motors and pilot motors or other pneumatically or electrically operated devices which are known in the art. This is carried out such that all movements of the screwing unit 22, the distance positioning supporting device 15, the gripping jaw device 17, the claw unit 27 and the positioning laying-on device 16 for said frame 4 being connected to the tie-bar 3 of the mounting frame, are networked with one another. Thus it is guaranteed that the spacer frame 4 and the muntin bars or the muntin grating 13 to be installed therein can be arranged into a desired screwing position before carrying out the screwing process, wherein these elements can be fixedly held until this process is terminated. In the drawing, number 12 characterizes the operation status in the direction of the spacer frame disclosing the holding and mounting device according to the invention, wherein the spacer frame and the muntin cross 13 are fixed before the said screwing unit 22 starts operation for screwing them together.

What is claimed is:

1. A controllable holding and mounting device comprising:

- a mounting frame and a tie-bar movably supported thereon for fixing a muntin to a spacer frame of an insulated glass window, said spacer frame having an upper surface, an inner wall and an outside wall,
- a positioning laying-on device for said frame adapted to carry a spacer frame to be machined,
- a gripping jaw device for gripping said muntin to be installed within the spacer frame,
- a screwing device adjustable both in its vertical and lateral directions, said screwing device having a head that is alignable relative to the outside wall of the spacer frame being gripped and being adapted to hold down for screwing the muntin to the inner wall of the spacer frame, and
- a distance positioning supporting device connected to the gripping jaw device, wherein all the devices are program-controlled in relation to each other.

2. The device according to claim 1, wherein the screwing device is movably supported on a bearing block, said bearing block being movable in a longitudinal direction of the tie-bar of the mounting frame.

3. The device according to claim 2, wherein the screwing device is connected to a guiding rail and is supported on a vertically adjustable plate such that said screwing device can be moved in longitudinal and lateral directions relative to the spacer frame.

4. The device according to claim 1, wherein the distance positioning supporting device is movably supported onto or above the spacer frame, respectively, and the spacer frame is gripped between the distance positioning supporting device and the positioning laying-on device connected with the tie-bar.

5. The device according to claim 1, further comprising a claw unit having a sensor pin, said claw unit being movable relative to the distance positioning supporting device and said sensor pin being adapted to scan the upper surface of the spacer frame.

6. The device according to claim 1, further comprising a claw unit that is movable relative to the tie-bar of the mounting frame and relative to a sensor pin arranged thereon.

7. The device according to claim 1, wherein the screwing unit is provided with a pneumatically operated supplying device for screws.

8. The device according to claim 1, wherein all the movements of the screwing device, the distance positioning supporting device, the gripping jaw device, a claw unit and the positioning laying-on device being connected to the tie-bar of the mounting frame, are networked with one another, so that it is guaranteed that the spacer frame and the muntin to be installed therein can be arranged into a desired screwing position before carrying out a screwing process, and can be fixedly held until said process is terminated.

9. The device according to claim 8, wherein a working mode is performed in an automatically and program controlled manner.

10. The device according to claim 1, wherein a working mode is performed in an automatically and program controlled manner.

11. A controllable holding and mounting device comprising:

a mounting frame and a tie-bar movably supported thereon for fixing a muntin to a spacer frame of an insulated glass window;

a positioning laying-on device connected to said tie-bar of said frame and being adapted to carry said spacer frame;

a gripping jaw device for positioning said muntin within said spacer frame;

a screwing device having a head, said screwing apparatus being movable relative to said spacer frame, said head being adapted to hold a screw; and a distance positioning supporting device, said supporting device being adapted to engage said spacer frame such that said spacer frame is fixed between said supporting device and said laying-on device, wherein the laying-on, gripping jaw, screwing and supporting devices are program-controlled in relation to each other.

12. The device according to claim 11, wherein said screwing device is pneumatically powered.

13. The device according to claim 11, wherein said screwing device is arranged on a bearing block, said bearing block being movably secured to said tie-bar.

14. The device according to claim 11, wherein said screwing device is connected to a guiding rail and a vertically adjustable plate that the screwing device is movable in a vertical and a lateral direction.

15. The device according to claim 14, wherein said screwing device is arranged on a bearing block, said bearing block being movable in a longitudinal direction of the tie-bar of the mounting frame.

16. The device according to claim 11, further comprising a plunger, said plunger being adapted to move said gripping jaw device.

* * * * *